United States Patent Office 2,982,773

Patented May 2, 1961

1

2,982,773

ACYLATED α:α-DIHYDROXY-DIAMINO-ANTHRAQUINONES

Paul Grossmann, Binningen, Switzerland, assignor to Ciba Limited, Basel, Switzerland No Drawing. Filed Sept. 9, 1958, Ser. No. 759,853

Claims priority, application Switzerland Dec. 21, 1956

11 Claims. (Cl. 260—377)

This is a continuation in part of my co-pending application Serial No. 701,324, filed December 9, 1957, now abandoned.

This invention provides acylated α:α-dihydroxy-diamino-anthraquinones, which consist of a single anthraquinone nucleus, in which each of the outer six-membered rings contains one of the amino groups and one of the hydroxyl groups, and in which one of the amino groups is acylated by the radical of an aliphatic monocarboxylic acid and the other amino group is acylated by a formyl radical, the radical of the formula —COO alkyl or aliphatic monocarboxylic acid containing at least three carbon atoms.

The invention also provides a process for the manufacture of these new dyestuffs by treating an α:α-dihydroxy-diamino-anthraquinone which consists of a single anthraquinone nucleus in which each of the outer six-membered rings contains one of the amino groups and one of the hydroxyl groups, to acylate one amino group with an agent introducing the radical of an aliphatic monocarboxylic acid, and, to acylate the other amino group with an agent yielding the radical of formic acid, a carbonic acid alkyl ester of an aliphatic monocarboxylic acid containing at least three carbon atoms.

As starting materials there are advantageously used dihydroxy-diamino-anthraquinones which are free from sulfonic acid and carboxylic acid groups. They may, however, contain further substituents in the anthraquinone nucleus, for example, halogen atoms or alkoxy groups. It is of advantage to use dihydroxy-diamino-anthraquinones which are free from further substituents, that is to say, those of the formula

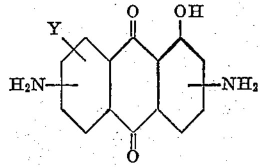

in which Y represents a hydroxyl group in an α-position and the amino groups are in ortho- or para-position to the hydroxyl groups. Suitable starting materials are, for example, those dihydroxy-diamino-anthraquinones in which both of the amino groups are in α-position. These dyestuffs correspond to the formula

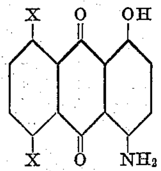

in which one X represents a hydroxyl group and the other X represents an amino group. Such compounds are known and are advantageously prepared by nitrating 1:5- or 1:8- dialkoxy or diphenoxy anthraquinone and reducing the dihydroxy-dinitro-anthraquinone to the dihydroxy-diamino-anthraquinone. There may also be used mixtures of 1:5-dihydroxy-4:8-diamino and 1:8-dihydroxy-4:5-diamino-anthraquinone.

2

Of special interest are those dihydroxy-diamino-anthraquinones in which at least one amino group is in ortho-position to a hydroxyl group. These compounds are obtained by methods in themselves known by nitrating 1:5- or 1:8-dihydroxy-anthraquinone in sulfuric acid at a low temperature. Under these conditions mixtures are obtained which consist for the greater part of 1:5- or 1:8-dihydroxy-dinitro-anthraquinones in which at least one nitro group is in ortho-position to an amino group. Since it is difficult to separate these mixtures into their components, it is desirable to reduce the mixture as such to the dihydroxy-diamino-anthraquinones and to use the latter in the form of the mixture.

There are mentioned below a few examples of dihydroxy-diamino-anthraquinones, which can be used as starting materials in the pure state or as constituents of mixtures.

1:5-dihydroxy-4:8-diamino-anthraquinone
1:8-dihydroxy-4:5-diamino-anthraquinone
1:5-dihydroxy-2:8-diamino-anthraquinone
1:5-dihydroxy-2:6-diamino-anthraquinone
1:8-dihydroxy-2:5-diamino-anthraquinone
1:8-dihydroxy-2:7-diamino-anthraquinone
1:5-dihydroxy-2:6-diamino-4:8-dichloranthraquinone
1:5-dihydroxy-2:6-diamino-4:8-dibromanthraquinone
1:8-dihydroxy-2:7-diamino-4:5-dichloranthraquinone In the process of this invention there are advantageously used acylating agents which introduce the radical of an aliphatic monocarboxylic acid containing 1–8 carbon atoms. The term "aliphatic monocarboxylic acids" includes, in addition to fatty acids, for example, formic acid, acetic acid, propionic acid, butyric acid, valeric acid, caproic acid or caprylic acid, cycloaliphatic carboxylic acids, for example, hexahydrobenzoic acid, or unsaturated aliphatic carboxylic acids, for example, acrylic acid, crotonic acid, or substituted, and especially halogenated carboxylic acids, for example, chloracetic acid or gamma-chlorobutyric acid and finally semi-esters of carbonic acids, for example, carbonic acid methyl or ethyl ester, which are not stable as such, but of which the halides can be used as acylating agents.

The acylation may be carried out in such manner, especially when only about one mol of acylating agent is used per mol of dihydroxy-diamino-anthraquinone, that first substantially only one amino group is acylated. When formic acid is used as acylating agent a mono-formyl-derivative is obtained even when an excess of the acylating agent is used.

The second amino group has to be acylated with formic acid or a chlorocarbonic alkylester of a reactive derivative of an aliphatic monocarboxylic acid containing at least three carbon atoms. Instead of reacting the two amino groups in succession with different acylating agents, a single acylation mixture may be reacted simultaneously with the dihydroxy-diamino-anthraquinone.

The reaction can be carried out by methods in themselves known, for example, in an inert medium such as acetone, nitrobenzene, chlorobenzene or the like, and advantageously in the presence of a tertiary base, such as pyridine or dimethylaniline. Advantageously the reaction is carried out at a raised temperature.

In the acylated dihydroxy-diamino-anthraquinones of this invention, one amino group is acylated by the radical of an aliphatic monocarboxylic acid, advantageously, acetic acid. The other amino group is acylated by the radical of formic acid, a carbonic acid monoalkylester or an aliphatic monocarboxylic acid containing at least three carbon atoms. Of special interest are acylated dihydroxy-diamino-anthraquinones of the formula

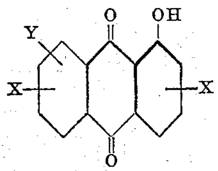

in which Y represents a hydroxyl group in α-position, one X represents an acyl amino group derived from an aliphatic monocarboxylic acid containing 1–8 carbon atoms, and the other X represents an acylamino group derived from formic acid, a carbonic acid monoalkyl ester or an aliphatic monocarboxylic acid containing 3–8 carbon atoms, the substituents both X's being in ortho- or para-position relatively to the hydroxyl groups. Accordingly, one, or advantageously both amino groups may be acylated. In the latter case, for example, both radicals X's may contain the same acyl radical containing 3–8 carbon atoms, for example, two propionyl-amino or butyryl-amino groups. Advantageously, however, both X's are different from one another, for example, one X may be an acetyl amino group and the other X may be a propionyl-amino or butyryl-amino group.

The dyestuffs of this invention may contain both acylamino groups in para-position to the hydroxyl groups. Such dyestuffs correspond to the general formula

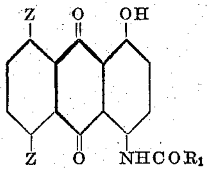

in which one Z represents a hydroxyl group, and the other Z represents a radical of the formula $—NHCOR_2$, and in which $R_1$ represents a hydrogen atom or an aliphatic radical containing 1–7 carbon atoms, and $R_2$ represents a hydrogen atom, an alkoxy group or an aliphatic radical containing 2–7 carbon atoms.

Alternatively, the dyestuffs of this invention may contain at least one acylamino group in ortho-position to a hydroxyl group.

The new dyestuffs or dyestuff mixtures are very suitable, especially after a suitable pasting operation, which may be combined with a precipitation, for example, from sulfuric acid, for dyeing or printing structures, and especially fibers of polyesters, for example, those consisting of alternate glycol and terephthalic acid radicals, and known in commerce under the name "Terylene" or "Dacron." There are produced on those materials by the usual dyeing methods, for example, from a dyebath which contains a dispersion of the dyestuff and advantageously a dispersing agent, at temperatures in the vicinity of 100° C., if desired, with the addition of a swelling agent, or at a temperature above 100° C. under superatmospheric pressure, yellowish to bluish red or violet tints which are distinguished by their excellent fastness to light and sublimation. Furthermore, the new dyestuffs can be used for dyeing or printing structures of cellulose esters or ethers, superpolyamides or superpolyurethanes, and also as pigments.

The following examples illustrate the invention, the parts and percentages being by weight:

*Example 1*

5.4 parts of butyryl chloride are added to 13.5 parts of 1:5-dihydroxy-4:8-diaminoanthraquinone in 45 parts of nitrobenzene and 13 parts of dimethylaniline at 35° C. The mixture is heated in the course of one hour to 50° C. and then slowly to about 120° C. There are then added 4 parts of acetyl chloride, and the whole is cooled after 15 minutes to about 20° C. 45 parts of methyl alcohol are added, the mixture is filtered and the filter residue is washed with methyl alcohol. There is obtained in excellent yield a dyestuff which is finely dispersed form dyes polyester fibers violet tints of excellent fastness to light and sublimation.

By using, instead of butyrylchloride, 5.6 parts of chloracetyl chloride, there is obtained a bluer shade. By using, instead of 1:5-dihydroxy-4:8-diamino-anthraquinone, 1:8-dihydroxy-4:5-diamino-anthraquinone, a redder shade is obtained. Instead of using nitrobenzene as solvent, a chlorobenzene, pyridine or picoline or the like may be used.

*Example 2*

13.5 parts of crude diamino-1:8-dihydroxy-anthraquinone (prepared by dinitrating chrysazine in concentrated sulfuric acid of about 95% strength followed by reduction with sodium sulfide) which probably consists preponderantly of 2:5-diamino-1:8-dihydroxy-anthraquinone are acylated, and the products isolated in the manner described in Example 1. There is obtained a dyestuff which in finely dispersed form dyes polyester fibers strong ruby red tints of excellent fastness to light and sublimation. A dyestuff yielding similar tints is obtained by similarly acylating crude diamino-1:5-dihydroxyanthraquinone.

By carrying out the nitration with sulfuric acid of 85% strength and otherwise proceeding in the same manner, a dyestuff yielding red tints is obtained.

*Example 3*

13.5 parts of crude diamino-1:8-dihydroxyanthraquinone (prepared by nitrating 1:8-dihydroxy-anthraquinone in nitrobenzene with nitric acid of 98% strength at 50–60° C. followed by reduction with sodium sulfide) are acylated and the product isolated as described in Example 1. There is obtained a dyestuff which dyes polyester fibers from fine dispersion scarlet red tints of excellent fastness to light.

*Example 4*

8.5 parts of 1:8-dihydroxy-4:5-dichloro-2:7-diamino-anthraquinone (prepared by dinitrating 1:8-dihydroxy-4:5-dichloranthraquinone in concentrated sulfuric acid and reducing the resulting dinitro derivative in water with glucose in the presence of caustic soda solution at 60° C.) are heated in 58 parts of chlorobenzene and 6.5 parts of dimethyl aniline with 3.3 parts of butyryl chloride and 1.9 parts of acetylchloride for about 15 minutes at 95–100° C. The chlorobenzene is distilled with steam with the addition of 2.6 parts of powdered chalk.

When finely dispersed, the dyestuff dyes polyester fibers brown-yellow tints which are fast to light and have an excellent fastness to sublimation.

The product obtained by acylating 1:5-dihydroxy-4:8-dichloro-2:6-diaminoanthraquinone in the same manner dyes polyester fibers brown tints having similar properties of fastness. Instead of the chloro-derivatives there may be used the bromo-derivatives and then similar dyestuffs are obtained.

*Example 5*

50 parts of 1:8-dihydroxy-4:5-diaminoanthraquinone are boiled in 500 parts of formic acid of 85 percent strength for about 1 hour until the presence of starting material can no longer be detected under the microscope. The monoformyl-compound is obtained in theoretical yield. In finely dispersed form it dyes polyester fibers pure blue tints having good qualities of fastness.

*Example 6*

7.45 parts of the monoformyl-compound of 1:8-dihydroxy-4:5-diaminoanthraquinone obtained as described in Example 5 are heated in 30 parts of chlorobenzene with 3.25 parts of dimethylaniline and 4.4 parts of caprylchloride for about 15 minutes at 100° C. whereby 1:8-dihydroxy-4-formylamino-8-caprylaminoanthraquinone is obtained which dyes polyester fibers violet tints of excellent fastness to light and sublimation.

This dyestuff can also be made in one operation, for example, by heating 6.75 parts of 1:8-dihydroxy-4:5-diaminoanthraquinone in 30 parts of nitro-benzene with 2.8 parts of formic acid for about 3 hours at 160° C., whereby the monoformyl-compound is formed, and subsequently continuing the acylation with caprylic acid chloride in the above manner. By using, instead of caprylic acid chloride, chlorocarbonic acid ethyl ester a dyestuff yielding violet blue tints is obtained.

*Example 7*

48 parts of 1:5-dihydroxy-anthraquinone are nitrated in 450 parts of sulfuric acid of 85% strength at 40–50° C. with 50.4 parts of a mixture of equal parts of nitric acid and sulfuric acid, the mixture is poured into water, then filtered, and the filter residue is washed neutral. The filter residue is then heated with 140 grams of sodium sulfide in 2 liters of water at 90° C., the mixture is filtered, and the filter residue is washed with about 1.5 liters of water at 90° C. From the filtrate the 1:5-dihydroxy-diaminoanthraquinone is precipitated with sodium bicarbonate, and the precipitate is filtered and washed neutral. The residue (about one third) dissolves in alcohol with a violet coloration, whereas the filtrate dissolves with a red coloration.

6.75 parts of the red product so obtained, which very probably consists of 1:5-dihydroxy-2:8-diamino- and a little 1:5-dihydroxy-2:6-diaminoanthraquinone, is heated in 30 parts of chlorobenzene and 6.5 parts of dimethylaniline and 6.6 parts of butyryl chloride for about 15 minutes at 95° C., the mixture is filtered in the cold, and the filter residue is washed with a small amount of methanol. The dyestuff dyes polyester fibers scarlet red tints of excellent fastness to light and sublimation.

By using, instead of 6.6 parts of butyryl chloride a mixture of:

(*a*) 3.5 parts of butyrylchloride and 2.5 parts of propionylchloride, there is obtained a dyestuff yielding an almost identical tint, but possessing a better affinity;

(*b*) 3.5 parts of crotonic acid chloride and 2 parts of acetylchloride, there is obtained a dyestuff yielding red tints;

(*c*) 2.5 parts of acrylic acid chloride and 2 parts of acetylchloride, there is obtained a dyestuff of yellow-red tints;

(*d*) 3.65 parts of hexahydrobenzoylchloride and 2 parts of acetylchloride, there is obtained a dyestuff yielding somewhat less yellowish tints than the dyestuff under (*c*);

(*e*) 3.3 parts of chlorocarbonic acid ethyl ester and two parts of acetyl chloride, there is obtained a dyestuff yielding a bluish red tint. All the dyestuffs under (*a*) to (*e*) yield dyeings of very good fastness to light and sublimation.

*Example 8*

50 parts of 1:8-dihydroxy-4:5-diaminoanthraquinone are boiled for about 1 hour in 500 parts of formic acid of 85% strength until no more starting material can be detected in the microscope. The monoformyl compound is obtained in theoretical yield.

7.45 parts of the monoformyl compound so obtained are heated in 30 parts of chlorobenzene with 3.25 parts of dimethylaniline and 2 parts of acetyl chloride for about 15 minutes at 95–100° C., 1:8-dihydroxy-4-formylamino-8-acetylaminoanthraquinone being obtained which dyes polyester fibers blue violet tints of excellent fastness to light and sublimation.

This dyestuff can also be prepared in one step by, for example, heating 6.75 parts of 1:8-dihydroxy-4:5-diaminoanthraquinone in 30 parts of nitrobenzene with 2.8 parts of formic acid for about 3 hours at 160° C., the monoformyl compound being formed; acylation is then continued with acetyl chloride as described above.

When chloracetyl chloride is used instead of acetyl chloride, a dyestuffs is obtained which dyes polyester fibers similar tints.

When chloroformic acid methyl ester is used instead of acetyl chloride, a dyestuff is obtained which dyes polyester fibers reddish blue tints.

*Example 9*

7.45 parts of the monoformylated mixture from 1:5-dihydroxy-2:8- and -2:6-diaminoanthraquinone are acylated with 2 parts of acetyl chloride as described in Example 1. A dyestuff is obtained which dyes polyester fibers red violet tints.

The mixture from 1:5-dihydroxy-2:8- and -2:6-diaminoanthraquinone used as starting material can be obtained as described in Example 7.

*Example 10*

4.7 parts of a mixture from about equal parts of 1:5-dihydroxy-4:8-diaminoanthraquinone and 1:8-dihydroxy-4:5-diaminoanthraquinone are heated in 21 parts of chlorobenzene and 4.5 parts of dimethylaniline, 1.8 parts of acetyl chloride and 2.5 parts of chloroformic acid methyl ester for about 15 minutes at 95° C. The mixture is precipitated cold with methyl alcohol, filtered and washed with methyl alcohol. The dyestuff dyes polyester fibers blue violet tints of very good fastness properties.

When chloroformic acid methyl ester is replaced by the corresopnding quantity of chloroformic acid ethyl ester, a redder dyestuff is obtained.

When chloroformic acid methyl ester is replaced by butyryl chloride, a red violet dyestuff is obtained.

When acetyl chloride is replaced by the corresponding quantity of chloroformic acid ethyl ester, a still bluer dyestuff is obtained.

*Example 11*

1.2 parts of the dyestuff obtained as described in the first paragraph of Example 1 are dissolved in 30 parts of sulfuric acid of 90% strength at 0° C., and the solution is poured on to ice and the mixture is filtered. The filter cake so obtained is ground with 1 part of dried sulfide-celulose waste liquor in a roller mill.

100 parts of fibrous material of a polyester of the type "Terylene" are first cleaned in a bath containing, per thousand parts of water, 1–2 parts of the sodium salt of N-benzyl-γ-heptadecyl benzimidazole disulfonic acid and 1 part of a concentrated aqueous solution of ammonia for ½ hour. The material is then entered into a dyebath in which the dyestuff paste obtained as described in the preceding paragraph has been dispersed with the addition of 4 parts of the sodium salt of N-benzyl-γ-heptadecyl-benzimidazole disulfonic acid. The whole is heated in a pressure vessel to 132° C. and is maintained at that temperature for about ½ hour. The material is then rinsed, and, if necessary, washed with a solution which contains in 100 parts of water 1 part of the sodium salt of N-benzyl-γ-heptadecyl benzimidazole disulfonic acid for ½ hour at 60–80° C. There is obtained a violet dyeing of excellent fastness to light and sublimation.

What is claimed is:

1. An acylated α:α-dihydroxy-diaminoanthraquinone which consists of a single anthraquinone nucleus in which each of the outer six-membered rings contains one of the amino and one of the hydroxyl groups, and in which one of the amino groups is acylated by the radical of an aliphatic monocarboxylic acid, and the other amino group is acylated by a member selected from the group consisting of the radicals of formic acid, of a carbonic acid mono-alkyl ester and of an aliphatic monocarboxylic acid having from 3 to 8 carbon atoms.

2. An anthraquinone dyestuff of the formula

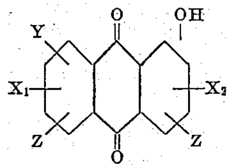

in which Y represents a hydroxyl group in an α-position, $X_1$ represents an acylamino group derived from a member selected from the group consisting of a carbonic acid monoalkyl ester and an aliphatic monocarboxylic acid containing 1–8 carbon atoms; $X_2$ represents an acylamino group derived from a member selected from the group consisting of formic acid, a carbonic acid monoalkyl ester and an aliphatic monocarboxylic acid containing 3–8 carbon atoms, $X_1$ and $X_2$ being different from one another, and Z stands for a member selected from the group consisting of a hydrogen, a bromine and a chlorine atom.

3. An anthraquinone dyestuff of the formula

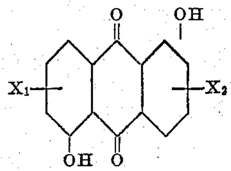

in which $X_1$ represents an acylamino group derived from a member selected from the group consisting of a carbonic acid monoalkyl-ester and an aliphatic monocarboxylic acid containing 1–8 carbon atoms and $X_2$ represents an acylamino group derived from a member selected from the group consisting of formic acid, a carbonic acid monoalkyl-ester and an aliphatic monocarboxylic acid containing 3–8 carbon atoms, $X_1$ and $X_2$ being different from one another, and in which at least one X is in a para-position to a hydroxyl group.

4. An anthraquinone dyestuff of the formula

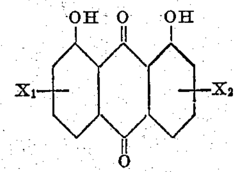

in which $X_1$ represents an acylamino group derived from a member selected from the group consisting of a carbonic acid monoalkyl-ester and an aliphatic monocarboxylic acid containing 1–8 carbon atoms and $X_2$ represents an acylamino group derived from a member selected from the group consisting of a carbonic acid monoalkyl-ester and an aliphatic monocarboxylic acid containing 3–8 carbon atoms, $X_1$ and $X_2$ being different from one another, and in which at least one X is in para-position to a hydroxyl group.

5. The anthraquinone dyestuff of the formula

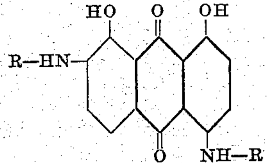

in which one R is an acetyl and the other R an n-butyryl radical.

6. The anthraquinone dyestuff of the formula

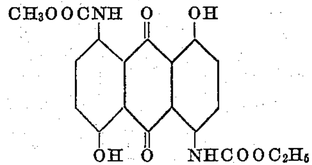

7. The anthraquinone dyestuff of the formula

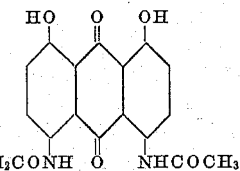

8. The anthraquinone dyestuff of the formula

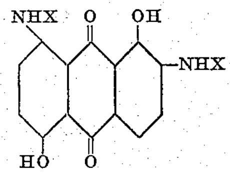

in which one X is a propionyl, the other X an n-butyryl radical.

9. The anthraquinone dyestuff of the formula

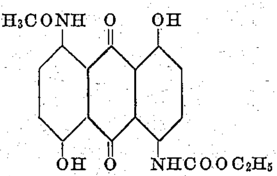

10. The anthraquinone dyestuff of the formula

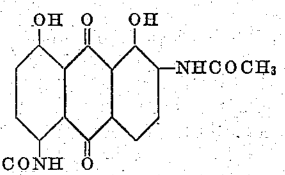

11. The anthraquinone dyestuff of the formula

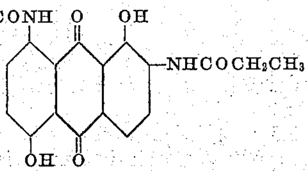

References Cited in the file of this patent

UNITED STATES PATENTS 2,090,948 Reeves et al. ---------- Aug. 24, 1937

FOREIGN PATENTS 445,192 Great Britain ---------- Mar. 27, 1936